US012633454B2

(12) United States Patent
Ueno et al.

(10) Patent No.: US 12,633,454 B2
(45) Date of Patent: May 19, 2026

(54) MULTILAYER CERAMIC CAPACITOR

(71) Applicant: Murata Manufacturing Co., Ltd., Nagaokakyo (JP)

(72) Inventors: Kenji Ueno, Nagaokakyo (JP); Shinya Isota, Nagaokakyo (JP); Yuta Oshima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 322 days.

(21) Appl. No.: 18/429,623

(22) Filed: Feb. 1, 2024

(65) Prior Publication Data

US 2024/0212932 A1    Jun. 27, 2024

Related U.S. Application Data

(63) Continuation of application No. PCT/JP2022/035445, filed on Sep. 22, 2022.

(30) Foreign Application Priority Data

Sep. 28, 2021    (JP) ................................. 2021-157773

(51) Int. Cl.
  *H01G 4/30*        (2006.01)
  *H01G 4/008*       (2006.01)
  (Continued)

(52) U.S. Cl.
  CPC ........... *H01G 4/0085* (2013.01); *H01G 4/012* (2013.01); *H01G 4/2325* (2013.01); *H01G 4/30* (2013.01)

(58) Field of Classification Search
  CPC .... H01G 4/0085; H01G 4/012; H01G 4/2325; H01G 4/30
  (Continued)

(56) References Cited

U.S. PATENT DOCUMENTS

| | | | |
|---|---|---|---|
| 2011/0141659 A1* | 6/2011 | Chang ...................... | H01G 4/30 361/321.2 |
| 2013/0094121 A1* | 4/2013 | Endo .................... | H01G 4/1209 361/305 |

(Continued)

FOREIGN PATENT DOCUMENTS

| | | |
|---|---|---|
| JP | 2017212366 A | 11/2017 |
| JP | 2020113575 A | 7/2020 |

(Continued)

OTHER PUBLICATIONS

International Search Report in PCT/JP2022/035445, mailed Nov. 1, 2022, 3 pages.

(Continued)

*Primary Examiner* — Arun Ramaswamy
(74) *Attorney, Agent, or Firm* — Keating & Bennett, LLP

(57) ABSTRACT

A multilayer ceramic capacitor includes a multilayer body including an inner layer portion in which multiple inner electrode layers and multiple inner dielectric layers are stacked alternately and two outer layer portions located at the surfaces on two sides of the inner layer portion in the stacking direction, with one outer layer portion on each side, and two outer electrodes located at end surfaces of the multilayer body, which are the surfaces on two sides in the length direction, with one outer electrode at each end surface. The inner electrode layers include outermost inner electrode layers, which are the closest to each of the outer layer portions, and an inside inner electrode layer, which is an inner electrode layer other than the outermost inner electrode layers.

15 Claims, 9 Drawing Sheets

(51) Int. Cl.
H01G 4/012 (2006.01)
H01G 4/232 (2006.01)

(58) Field of Classification Search
USPC ............. 361/301.4, 311, 321.1, 321.4, 321.5
See application file for complete search history.

(56) References Cited

U.S. PATENT DOCUMENTS

| | | | |
|---|---|---|---|
| 2016/0126014 A1* | 5/2016 | Lee ........................ | H01G 4/224 |
| | | | 29/25.42 |
| 2017/0345567 A1 | 11/2017 | Sakate et al. | |
| 2020/0312555 A1 | 10/2020 | Doi et al. | |
| 2021/0159014 A1 | 5/2021 | Kowase | |

FOREIGN PATENT DOCUMENTS

| | | | |
|---|---|---|---|
| JP | 2020167198 A | 10/2020 | |
| JP | 2021082779 A | 5/2021 | |
| KR | 20200095443 A | 8/2020 | |

OTHER PUBLICATIONS

Written Opinion in PCT/JP2022/035445, mailed Nov. 1, 2022, 4 pages.

* cited by examiner

FIG. 9

| | OUTERMOST INNER ELECTRODE LAYERS (CV) | INSIDE INNER ELECTRODE LAYERS (CV) | OUTER LAYER PORTIONS | | | RELIABILITY | ASSESSMENT RESULT |
|---|---|---|---|---|---|---|---|
| | | | Ni CONTENT (MOL%) IN RELATION TO Ti (mol%) | Mg CONTENT (MOL%) IN RELATION TO Ti (mol%) | Mn CONTENT (MOL%) IN RELATION TO Ti (mol%) | MTTF(hr) | |
| EXAMPLE 1 | 0.20 | 0.23 | 0.2 | 0.002 | 0.60 | 75 | ○ |
| EXAMPLE 2 | 0.13 | 0.22 | 0.4 | 0.001 | 0.60 | 95 | ◎ |
| EXAMPLE 3 | 0.10 | 0.25 | 1.0 | 0.001 | 0.60 | 99 | ◎ |
| EXAMPLE 4 | 0.09 | 0.23 | 1.5 | 0.001 | 0.60 | 105 | ◎ |
| EXAMPLE 5 | 0.09 | 0.24 | 2.0 | 0.001 | 0.60 | 102 | ◎ |
| EXAMPLE 6 | 0.10 | 0.22 | 3.5 | 0.001 | 0.60 | 99 | ◎ |
| EXAMPLE 7 | 0.09 | 0.22 | 5.0 | 0.001 | 0.60 | 98 | ◎ |
| EXAMPLE 8 | 0.11 | 0.23 | 7.0 | 0.002 | 0.60 | 79 | ○ |
| EXAMPLE 9 | 0.10 | 0.24 | 10.0 | 0.001 | 0.60 | 78 | ○ |
| EXAMPLE 10 | 0.19 | 0.23 | 1.5 | AT OR BELOW THE ANALYTICAL LIMIT | 0.60 | 74 | ○ |
| EXAMPLE 11 | 0.09 | 0.24 | 1.5 | 0.005 | 0.60 | 100 | ◎ |
| EXAMPLE 12 | 0.10 | 0.23 | 1.5 | 0.010 | 0.60 | 101 | ◎ |
| EXAMPLE 13 | 0.16 | 0.25 | 1.5 | 0.050 | 0.60 | 81 | ○ |
| EXAMPLE 14 | 0.17 | 0.23 | 1.5 | 0.500 | 0.60 | 78 | ○ |
| EXAMPLE 15 | 0.19 | 0.24 | 1.5 | 1.000 | 0.60 | 73 | ○ |
| EXAMPLE 16 | 0.14 | 0.23 | 1.5 | 0.001 | 1.00 | 80 | ○ |
| EXAMPLE 17 | 0.09 | 0.23 | 1.5 | 0.001 | 0.80 | 112 | ◎ |
| EXAMPLE 18 | 0.10 | 0.22 | 1.5 | 0.001 | 0.40 | 108 | ◎ |
| EXAMPLE 19 | 0.12 | 0.24 | 1.5 | 0.001 | 0.20 | 97 | ◎ |
| EXAMPLE 20 | 0.13 | 0.23 | 1.5 | 0.001 | 0.05 | 95 | ◎ |
| EXAMPLE 21 | 0.15 | 0.27 | 1.5 | 0.001 | 0.03 | 78 | ○ |
| COMPARATIVE EXAMPLE 1 | 0.25 | 0.24 | 0.0 | 0.001 | 0.60 | 51 | × |
| COMPARATIVE EXAMPLE 2 | 0.28 | 0.23 | 0.2 | 1.000 | 0.60 | 35 | × |
| COMPARATIVE EXAMPLE 3 | 0.35 | 0.22 | 0.2 | 1.500 | 0.60 | 24 | × |
| COMPARATIVE EXAMPLE 4 | 0.32 | 0.32 | 0.2 | 0.001 | 0.01 | 1.6 | × |

MULTILAYER CERAMIC CAPACITOR

CROSS REFERENCE TO RELATED APPLICATIONS

This application claims the benefit of priority to Japanese Patent Application No. 2021-157773, filed on Sep. 28, 2021, and is a Continuation Application of PCT Application No. PCT/JP2022/035445, filed on Sep. 22, 2022. The entire contents of each application are hereby incorporated herein by reference.

BACKGROUND OF THE INVENTION

1. Field of the Invention

The present invention relates to a multilayer ceramic capacitor.

2. Description of the Related Art

Multilayer ceramic capacitors are known that are produced by stacking multiple dielectric layers and multiple inner electrode layers alternately, placing outer layer portions on two sides in the stacking direction thereafter, and then firing the workpiece. For such multilayer ceramic capacitors, there has been a need for a smaller size and a greater capacitance in recent years. To achieve a smaller size and a greater capacitance, furthermore, the inner electrode layers and the inner dielectric layers have been made thinner. At the same time, the number of layers stacked has been increased, and the regions other than the active region sandwiched between the inner electrode layers, such as the outer layer portions, have been minimized (see, for example, Japanese Unexamined Patent Application Publication No. 2021-082779).

SUMMARY OF THE INVENTION

When the regions other than the active region are minimized, however, the environmental resistance of the multilayer ceramic capacitor decreases. When fired, furthermore, the inner electrodes that are positioned outermost is likely to degrade. As a result of these, the mean time to failure of the multilayer ceramic capacitor shortens.

Example embodiments of the present invention provide a multilayer ceramic capacitor with an improved length of the mean time to failure.

To solve the above problems with the prior art, an example embodiment of the present invention provides a multilayer ceramic capacitor including a multilayer body including an inner layer portion in which multiple inner electrode layers and multiple inner dielectric layers are stacked alternately and two outer layer portions located at surfaces on two sides of the inner layer portion in a stacking direction, with one outer layer portion on each side, and two outer electrodes located at end surfaces of the multilayer body, the end surfaces being surfaces on two sides in a length direction, which crosses the stacking direction, with one outer electrode at each end surface. The inner electrode layers include outermost inner electrode layers, which are the closest to each of the outer layer portions, and an inside inner electrode layer, which is an inner electrode layer other than the outermost inner electrode layers, at least one of the outer layer portions includes a Ni-free region extending within about 0.9 μm from the outermost inner electrode layer closest to the outer layer portion and a Ni-containing region extending away from the outermost inner electrode layer by more than about 0.9 μm, and at least one of the outermost inner electrode layers is thicker than the inside inner electrode layer, with smaller variations in thickness.

According to the present invention, there can be provided a multilayer ceramic capacitor with an improved length of the mean time to failure.

The above and other elements, features, steps, characteristics and advantages of the present invention will become more apparent from the following detailed description of the example embodiments with reference to the attached drawings.

BRIEF DESCRIPTION OF THE DRAWINGS

FIG. 9 is a table presenting the results of a measurement of the mean time to failure of multilayer ceramic capacitors of examples and comparative example embodiments of the present invention.

DETAILED DESCRIPTION OF THE EXAMPLE EMBODIMENTS

Figure 1:
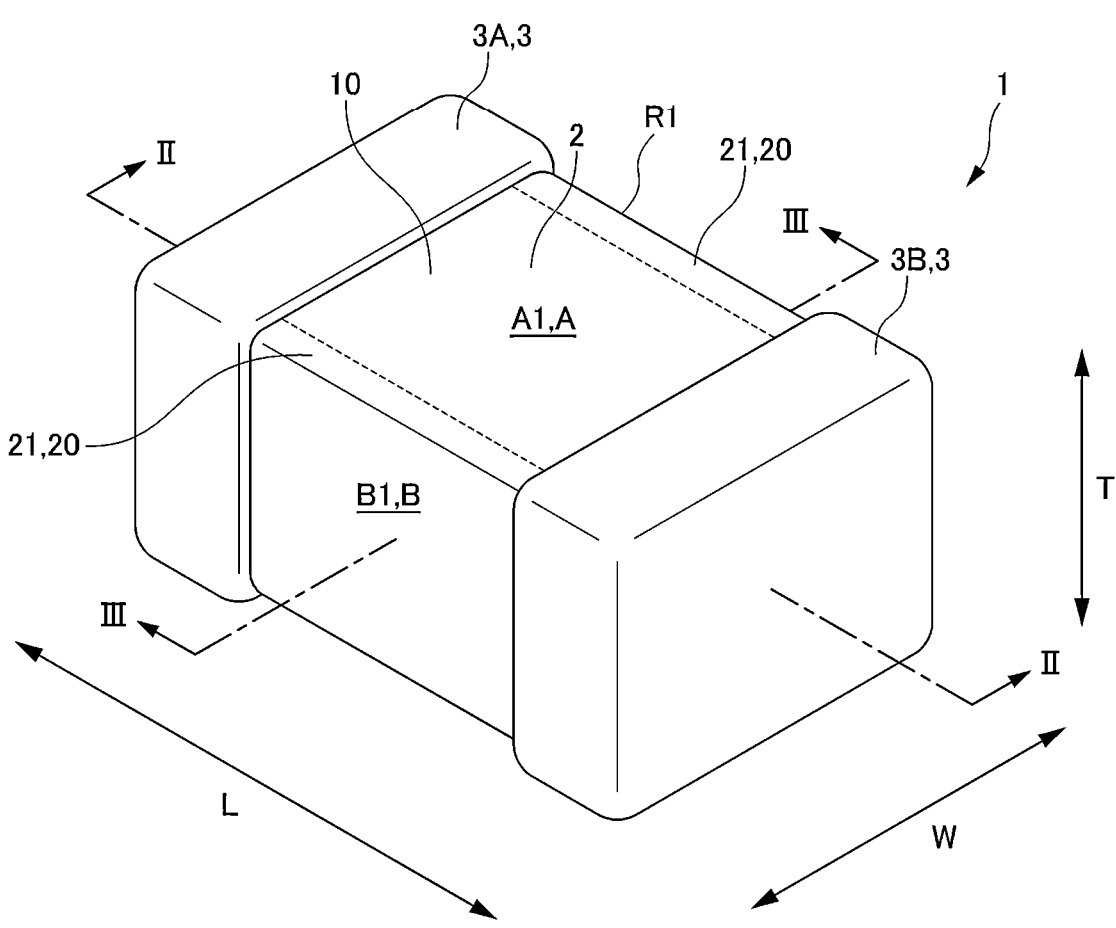
FIG. 1 is a schematic perspective view of a multilayer ceramic capacitor 1 according to an example embodiment of the present invention.
Figure 2:
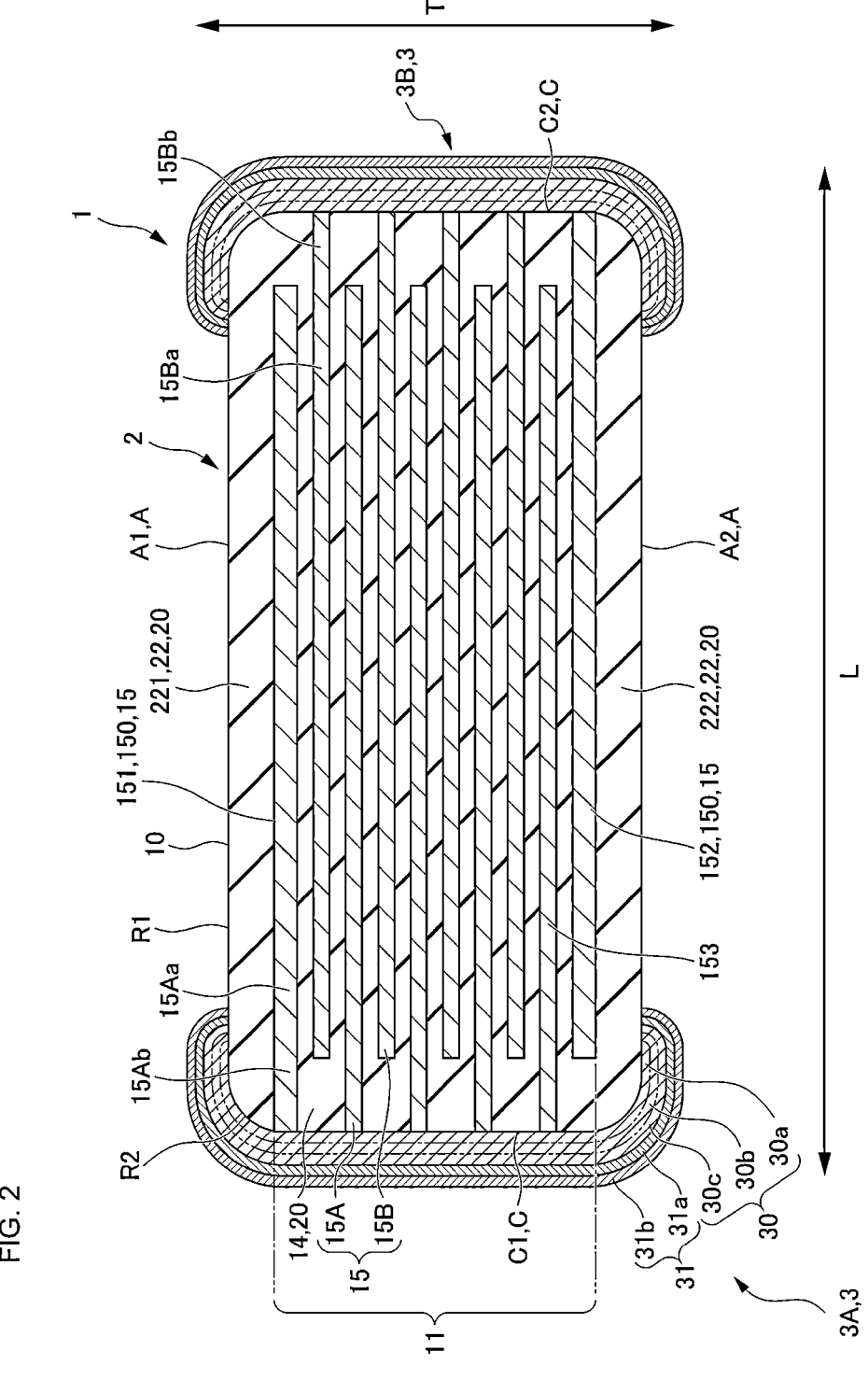
FIG. 2 is a cross-sectional view of the multilayer ceramic capacitor 1 in FIG. 1 along line II-II.
Figure 3:
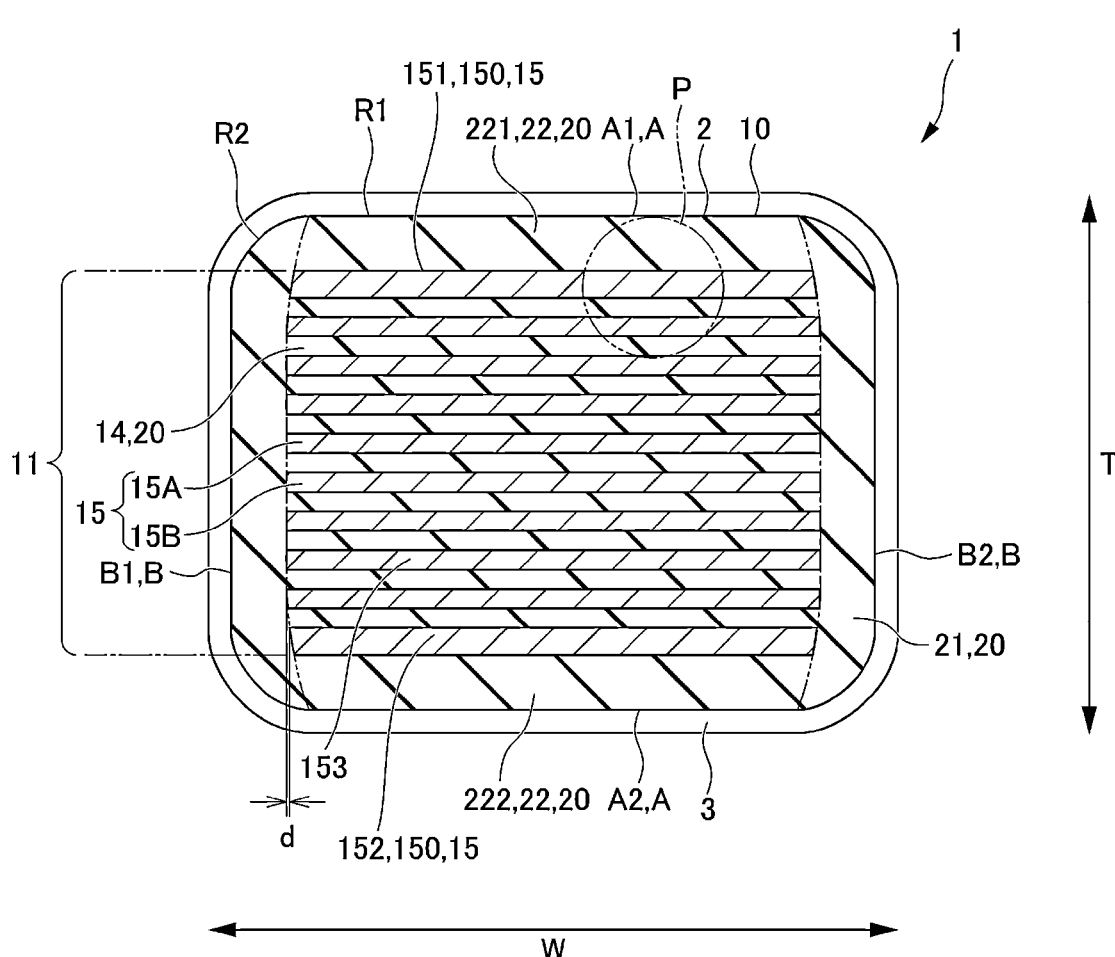
FIG. 3 is a cross-sectional view of the multilayer ceramic capacitor 1 in FIG. 1 along line III-III.

A multilayer ceramic capacitor 1 according to an example embodiment of the present invention will now be described. FIG. 1 is a schematic perspective view of a multilayer ceramic capacitor 1 according to an example embodiment of the present invention. FIG. 2 is a cross-sectional view of the multilayer ceramic capacitor 1 in FIG. 1 along line II-II. FIG. 3 is a cross-sectional view of the multilayer ceramic capacitor 1 in FIG. 1 along line III-III.

The multilayer ceramic capacitor 1 is preferably cuboid or substantially cuboid in shape and includes a multilayer body 2 and a pair of outer electrodes 3 located at two ends of the multilayer body 2. The multilayer body 2 preferably includes an inner layer portion 11 in which inner dielectric layers 14 and inner electrode layers 15 are stacked.

The dimensions of the multilayer ceramic capacitor 1 are preferably, for example, about 0.1 mm or more and about 0.5 mm or less in the width direction W, about 0.1 mm or more and about 0.5 mm or less in the thickness direction, and about 0.05 mm or more and about 1.0 mm or less in the length direction L.

In the following description, as a term that represents the orientation of the multilayer ceramic capacitor 1, the direction in which the multilayer ceramic capacitor 1 has its pair of outer electrodes 3 is defined as the length direction L. The direction in which the inner dielectric layers 14 and the inner electrode layers 15 are stacked is defined as the stacking direction T. A direction that crosses both of the length direction L and the stacking direction T is defined as the width direction W. In an example embodiment, the width direction W is perpendicular to both of the length direction L and the stacking direction T. The multilayer ceramic capacitor 1 according to an example embodiment is longer in the length direction L than in the width direction W and the stacking direction T but is not limited to this; the dimension in the length direction L does not need to be longer than those in the width direction W and the stacking direction T.

In the following description, furthermore, of the six outer surfaces of the multilayer body 2, the pair of outer surfaces opposing each other in the stacking direction T are defined as the first primary surface A1 and the second primary surface A2, the pair of outer surfaces opposing each other in the width direction W are defined as the first side surface B1 and the second side surface B2, and the pair of outer surfaces opposing each other in the length direction L are defined as the first end surface C1 and the second end surface C2. When there is no need to describe the first primary surface A1 and the second primary surface A2 with specific differentiation between them, they are described collectively as the primary surfaces A, when there is no need to describe the first side surface B1 and the second side surface B2 with specific differentiation between them, they are described collectively as the side surfaces B, and when there is no need to describe the first end surface C1 and the second end surface C2 with specific differentiation between them, they are described collectively as the end surfaces C.

The multilayer body 2 includes a multilayer body chip 10 and side margin portions 21 located on two sides of the multilayer body chip 10 in the width direction W. The multilayer body chip 10 preferably includes the inner layer portion 11, in which the inner dielectric layers 14 and the inner electrode layers 15 are stacked, a first outer layer portion 221, which is located on the first primary surface A1 side, in the stacking direction T, of the inner layer portion 11, and a second outer layer portion 222, which is located on the second primary surface A2 side. When there is no need to describe the first outer layer portion 221 and the second outer layer portion 222 with specific differentiation between them, they are described collectively as the outer layer portions 22.

The multilayer body 2 is cuboid or substantially cuboid in shape, but preferably, its corners R1 and edges R2 are rounded. A corner R1 is a portion at which a primary surface A, a side surface B, and an end surface C intersect. An edge R2 is a portion at which two surfaces of the multilayer body 2, e.g., a primary surface A and a side surface B, a primary surface A and an end surface C, or a side surface B and an end surface C intersect.

The inner layer portion 11 is a portion in which inner dielectric layers 14 and inner electrode layers 15 are stacked alternately along the stacking direction T. In an example embodiment, two ends of the inner layer portion 11 in the stacking direction T are inner electrode layers 15.

The inner electrode layers 15 preferably contain, for example, Ni as their primary constituent and may further contain dielectric particles that are in the same composition system as a ceramic contained in the inner dielectric layers 14. Sn, furthermore, may be located at the interfaces between the inner electrode layers 15 and the inner dielectric layers 14. In that case, Sn may exist in layer form or may be interspersed. In addition, Sn may be dissolved in the inner electrode layers 15 or may be dissolved in particles of a dielectric material in the dielectric layers.

The inner electrode layers 15 include multiple first inner electrode layers 15A and multiple second inner electrode layers 15B. The first inner electrode layers 15A and the second inner electrode layers 15B are arranged alternately.

A first inner electrode layer 15A includes a first opposing portion 15Aa, which opposes a second inner electrode layer or layers 15B, and a first extended portion 15Ab, which is extended from the first opposing portion 15Aa toward the first end surface C1. An end portion of the first extended portion 15Ab is exposed on the first end surface C1 and electrically coupled to a first outer electrode 3A, which will be described later herein. A second inner electrode layer 15B has a second opposing portion 15Ba, which opposes a first inner electrode layer or layers 15A, and a second extended portion 15Bb, which is extended from the second opposing portion 15Ba toward the second end surface C2. An end portion of the second extended portion 15Bb is electrically coupled to a second outer electrode 3B, which will be described later herein. The inner electrode layers 15, between which the inner dielectric layers 14 are sandwiched, function as a capacitor by accumulating electric charge between the first opposing portion 15Aa, of the first inner electrode layers 15A, and the second opposing portion 15Ba, of the second inner electrode layers 15B.

As illustrated in FIG. 3, in the WT cross-section that is a cross-section extending in the width direction W and the stacking direction T and passes through the center of the multilayer body 2, the difference d in the position in the stacking direction T of the end portions in the width direction W between two of a first inner electrode layer 15A and a second inner electrode layer 15B adjacent one above the other in the stacking direction T is preferably about 5 μm or less, more preferably about 0.5 μm or less. In other words, the end portions in the width direction W of a first inner electrode layer 15A and a second inner electrode layer 15B adjacent one above the other in the stacking direction T are at substantially the same position in the width direction W; the end portions are aligned in the stacking direction T.

The total number of the inner electrode layers 15 is preferably about 10 or more and about 1000 or fewer.

The inner electrode layers 15, furthermore, include a first outermost inner electrode layer 151, which is the closest to the first outer layer portion 221, a second outermost inner electrode layer 152, which is the closest to the second outer layer portion 222, and inside inner electrode layers 153, which are the inner electrode layers other than the first outermost inner electrode layer 151 and the second outermost inner electrode layer 152. When there is no need to describe the first outermost inner electrode layer 151 and the second outermost inner electrode layer 152 with specific differentiation between them, they are described collectively as the outermost inner electrode layers 150.

The thickness of the inside inner electrode layers 153 is preferably about 0.3 μm or more and about 0.4 μm or less, more preferably about 0.3 μm or more and about 0.35 μm or less. In addition, the standard deviation/average that indicates variations in the thickness of the inside inner electrode layers 153 is about 0.22 or greater and about 0.27 or less.

The standard deviation/average as an indicator of variations in thickness is determined according to the following formula.

$$CV = \sigma / Ave$$

Ave: Average thickness

σ: Standard deviation of the thickness

In the following, a standard deviation/average is presented as a CV.

At least one of the first outermost inner electrode layer 151 or the second outermost inner electrode layer 152 is thicker than the inside inner electrode layers 153. In an example embodiment, both of the first outermost inner electrode layer 151 and the second outermost inner electrode layer 152 are thicker than the inside inner electrode layers 153. The thickness of the outermost inner electrode layers 150 is preferably about 0.4 μm or more and about 0.5 μm or less, more preferably about 0.4 μm or more and about 0.45 μm or less. The CV that indicates variations in the thickness of the outermost inner electrode layers 150, furthermore, is about 0.09 or greater and about 0.17 or less, which is smaller than that for the inside inner electrode layers 153.

As for the method for measuring the thickness of the inner electrode layers 15, i.e., the outermost inner electrode layers 150 and inside inner electrode layers 153, the measurement is preferably performed, for example, as follows. First, the LT cross-section that passes through the center of the multilayer ceramic capacitor 1 is polished to expose the inner layer portion 11. Optionally, the cross-section on which the observation point has been exposed is subjected to an etching treatment, and thereby electrically conductive layers elongated during the polishing are removed.

Figure 4:
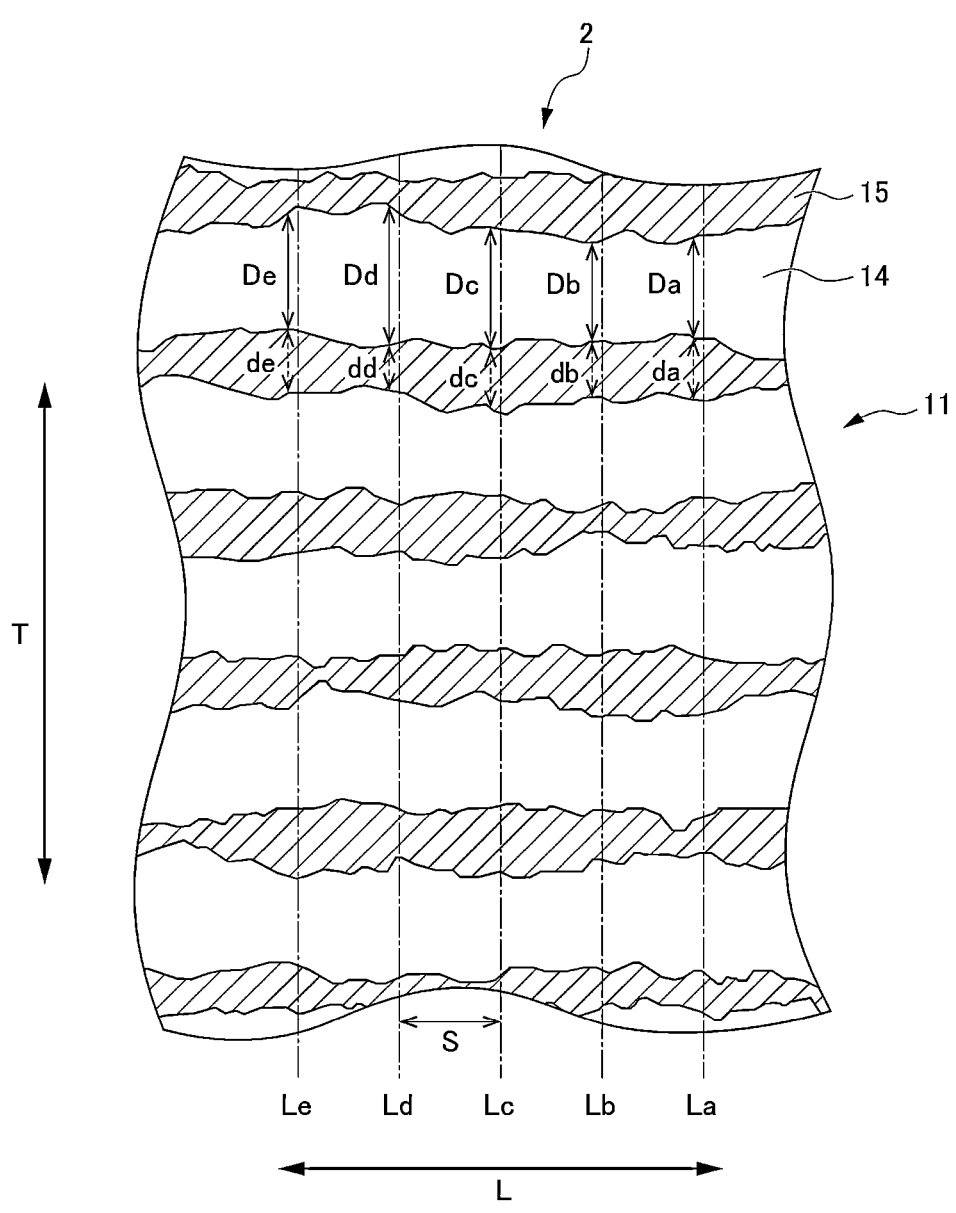
FIG. 4 is an example of an enlarged image of a cross-section of an inner layer portion 11 according to an example embodiment of the present invention.

FIG. 4 is an example of an enlarged image of an exposed cross-section of the inner layer portion 11. In the illustrated enlarged image, multiple straight lines La, Lb, Lc, Ld, and Le that extend in the stacking direction T, for example, are drawn at regular intervals with a pitch of S. The pitch S is preferably approximately fivefold or more and tenfold or less larger than the thickness of the inner electrode layer 15 (outermost inner electrode layer 150 or inside inner electrode layer 153) being measured. For example, when an inner electrode layer 15 with a thickness of approximately 1 μm is measured, the pitch S is set to about 5 μm.

Then, along each of the five straight lines La, Lb, Lc, Ld, and Le, the thickness da, db, dc, dd, or de of the inner electrode layer 15 is measured. When, however, the inner electrode layer 15 is broken along the straight lines La, Lb, Lc, Ld, and Le in such a manner that the inner dielectric layers 14 sandwiching this inner electrode layer 15 are connected together or when the enlarged view of the measurement point is unclear, new straight lines are drawn, and the thickness of the inner electrode layer 15 is measured.

For the inside inner electrode layers 153, when the number of layers stacked is fewer than five, the thickness is measured according to the above method for all inside inner electrode layers 153, and the average is used as the average thickness of the multiple inside inner electrode layers 153. The thickness of the inner dielectric layers 14, too, can be measured in the same manner as that of the inside inner electrode layers 153.

As for the outermost inner electrode layers 150, the thickness of the first outermost inner electrode layer 151 and that of the second outermost inner electrode layer 152 are measured separately. That is, the thickness da, db, dc, dd, or de of the first outermost inner electrode layer 151 along each of the five straight lines La, Lb, Lc, Ld, and Le is measured, and the average is used as the thickness of the first outermost inner electrode layer 151. The thickness da, db, dc, dd, or de of the second outermost inner electrode layer 152 along each of the five straight lines La, Lb, Lc, Ld, and Le is measured, and the average is used as the thickness of the second outermost inner electrode layer 152.

The inner dielectric layers 14 are preferably made of, for example, a dielectric ceramic containing Ba and Ti components and contain Si. A material obtained by adding, to these components, components in smaller amounts than the major components, such as a Mn compound, an Fe compound, a Cr compound, a Co compound, and a Ni compound, may also be used.

The total number of the inner dielectric layers 14 and the outer layer portions 22 is preferably about 100 or more and about 2000 or fewer.

The inner dielectric layers 14 are preferably about 0.4 μm or more and about 0.5 μm or less, more preferably about 0.4 μm or more and about 0.45 μm or less. As stated above, the thickness of the inner dielectric layers 14, too, can be determined in the same manner as that of the inner electrode layers 15, by measuring the thickness Da, db, Dc, Dd, or De of the inner dielectric layer 14 along each of five straight lines La, Lb, Lc, Ld, and Le and finding the average.

The outer layer portions 22 are dielectric layers that are located on two primary surface A sides of the multilayer body 2 and positioned between the primary surfaces A and the inner electrode layers 15 closest to the primary surfaces A. As stated above, the outer layer portions 22 include a first outer layer portion 221, which is located on the first primary surface A1 side, in the stacking direction T, of the inner layer portion 11, and a second outer layer portion 222, which is located on the second primary surface A2 side.

The outer layer portions 22 preferably contain Ba, Ti, and Ni, for example. The mol % of Ni to Ti in the outer layer portions 22 is preferably about 0.4 mol % or more and about 5.0 mol % or less. However, at least one of the first outer layer portion 221 or the second outer layer portion 222, both outer layer portions 22 in an example embodiment, includes a Ni-free region 22A, which contains little Ni, within about 0.9 μm from the outermost inner electrode layer 150 that the outer layer portion 22 adjoins. The region extending away from the outermost inner electrode layer 150 by more than about 0.9 μm is a Ni-containing region 22B, which contains Ni. In an example embodiment, the Ni-free region 22A may be completely devoid of Ni or may contain a minimal amount (about 0.2 mol % or less) of Ni compared with the Ni-containing region.

The outer layer portions 22, furthermore, contain Mg and Mn. The amount of Mg, however, is minimal, and the mol % to the molar of Mg to Ti is preferably about 0.001 mol % or more and about 0.01 mol % or less. The mol % of Mn to Ti, furthermore, is preferably about 0.05 mol % or more and about 0.8 mol % or less.

The side margin portions 21 are located on two side surface B sides of the multilayer body chip 10, i.e., two side surface B sides of the outer layer portions 22 and the inner layer portion 11, and cover the side surface B sides of the outer layer portions 22 and the inner layer portion 11. The dielectric material for the side margin portions is preferably the same as that for the outer layer portions and the inner layer portion in an example embodiment, but may alternatively be different if so desired.

Figure 5:
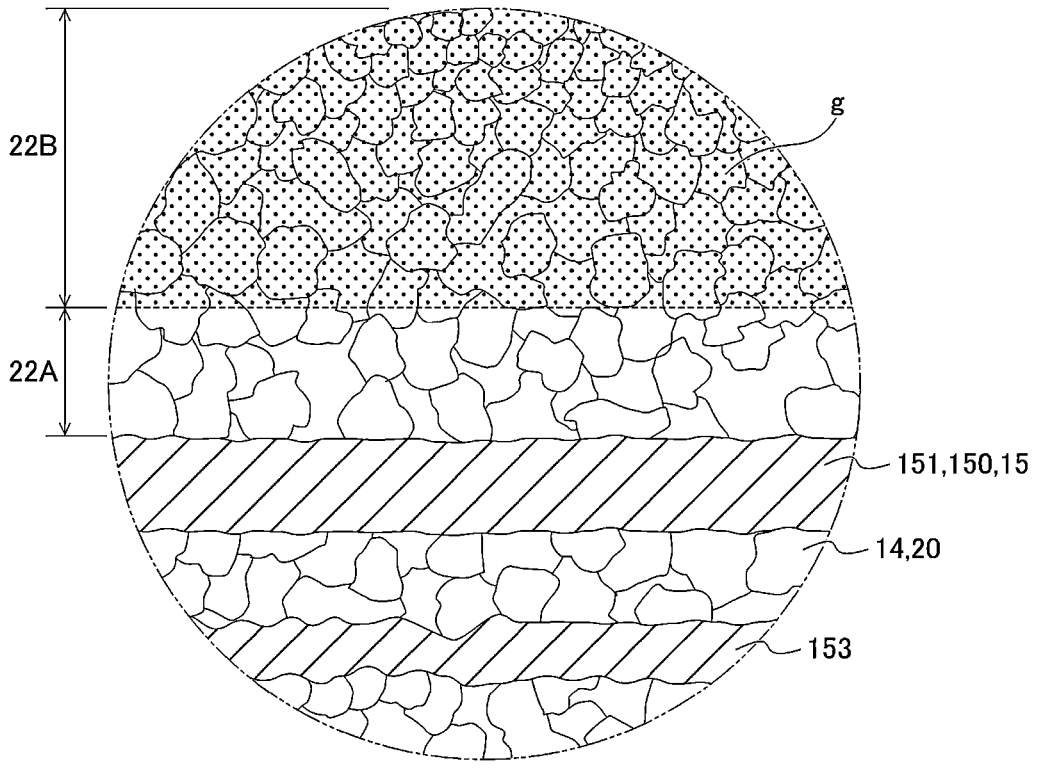
FIG. 5 is an enlarged view of portion P, the encircled portion, of FIG. 3.

In this example embodiment, the inner dielectric layers 14, the outer layer portions 22, and the side margin portions 21 are collectively referred to as the dielectric layers 20. The dielectric layers 20 contain multiple grains g. FIG. 5 is an enlarged view of portion P, the encircled portion, of FIG. 3, illustrating grains g. The grains g preferably constitute a ceramic layer that contains a Ba- and Ti-containing perovskite compound and at least one other minor ingredient. The minor ingredient is at least one of, for example, La, Ce, Pr, Nd, Sm, Eu, Gd, Tb, Dy, Ho, Er, Tm, Yb, Lu, or Y.

At least in the outer layer portions 22, the grains g further contain Ni as a minor ingredient. Ni has the effect of preventing the growth of the grains g, and, by virtue of the inclusion of Ni in the outer layer portions 22, the growth of the grains g in the outer layer portions 22 is inhibited during sintering, which will be described later herein, with effectiveness increasing with distance outward.

As a result of the inhibited growth of grains g in the outer portion of the outer layer portions 22 and the resulting small grain size, the interfaces are smooth, and, therefore, the interfaces do not increase. No portion is created in which the device thickness is the thinnest, helping improve reliability.

In an example embodiment, however, the grains g in the Ni-containing region 22B preferably contain Ni, but the grains g in the Ni-free region 22A contain no Ni. This is because during sintering, Ni present in the region that is to be the Ni-free region 22A is absorbed into the outermost inner electrode layers 150.

Figure 6:
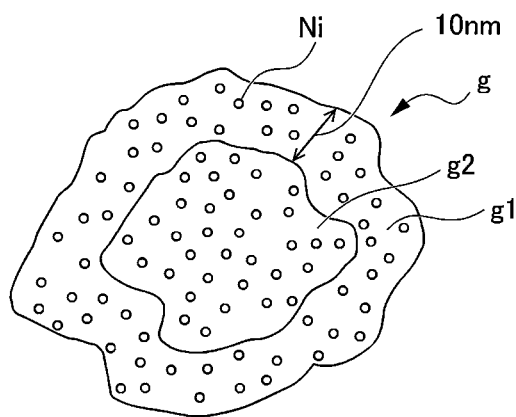
FIG. 6 is a diagram illustrating the state of distribution of Ni in one grain contained in the Ni-containing region 22B of an outer layer portion 22 according to an example embodiment of the present invention.

FIG. 6 is a diagram illustrating the state of distribution of Ni in one grain g contained in the Ni-containing region 22B. In an example embodiment, Ni is contained substantially uniformly inside one grain g contained in the Ni-containing region 22B; Ni is dissolved in the grain g.

As used herein, substantially uniform means that the difference between the molar ratio (mol %) of Ni to Ti in the outer region g1 of the grain g, which extends within approximately 10 nm from the periphery of the grain g, and the molar ratio (mol %) of Ni to Ti in the central region g2 of the grain g, which is the region other than the outer region g1, is within about ±20%.

The present invention, however, is not limited to this. For Ni, the difference between the molar ratio (mol %) of Ni to Ti in the outer region g1 of the grain g, which extends within approximately 10 nm from the periphery of the grain g, and the molar ratio (mol %) of Ni to Ti in the central region g2 of the grain g, which is the region other than the outer region g1, may be beyond about ±20%, and Ni may exist in a segregated fashion, for example in one of the outer region g1 or the central region g2, inside one grain g contained in the Ni-containing region 22B.

In the measurement of the uniformity of Ni, an image taken with a TEM (transmission electron microscope) to include 100 or more grains g in a field of view of 1000 nm×1000 nm is used. Measurement with grains g that are out of shape is avoided; grains g in which the outer region g1 and the central region g2 are clearly distinguishable are selected.

For the selected grains g, Ni is detected, and the mol % of Ni to Ti in the outer region g1 and the mol % of Ni to Ti in the central region g2 are determined. In an example embodiment, the difference between the mol % of Ni to Ti in the outer region g1 and the mol % of Ni to Ti in the central region g2 is within about ±20%.

In the dielectric layers 20 other than the outer layer portions 22, i.e., in the inner dielectric layers 14 and the side margin portions 21, Ni in the grains g may be uniform as in the outer layer portions 22. Alternatively, unlike that in the outer layer portions 22, Ni may be segregated in portion of the layer or portion, or Ni may be absent.

The outer electrodes 3 include a first outer electrode 3A, which is located at the first end surface C1 of the multilayer body 2, and a second outer electrode 3B, which is located at the second end surface C2 of the multilayer body 2. When there is no need to describe the first outer electrode 3A and the second outer electrode 3B with specific differentiation between them, they are described collectively as the outer electrodes 3. The outer electrodes 3 cover not only the end surfaces C but also part of the primary surfaces A and side surfaces B close to the end surfaces C.

As stated above, an end portion of the first extended portion 15Ab, of the first inner electrode layers 15A, is exposed on the first end surface C1 and electrically coupled to the first outer electrode 3A. An end portion of the second extended portion 15Bb, of the second inner electrode layers 15B, furthermore, is exposed on the second end surface C2 and electrically coupled to the second outer electrode 3B. As a result of this, the portion between the first outer electrode 3A and the second outer electrode 3B is a structure in which multiple capacitor elements are coupled electrically in parallel.

In an example embodiment, the outer electrodes 3 include a base electrode layer 30 and a plating layer 31 located on the base electrode layer 30.

The base electrode layer 30 includes at least one layer selected from layers such as a baked layer 30a, a conductive resin layer 30b, and a thin-film layer 30c. In an example embodiment, the base electrode layer 30 preferably includes all three of a baked layer 30a, a conductive resin layer 30b, and a thin-film layer 30c.

The baked layer 30a contains at least one metal selected from, for example, Cu, Ni, Ag, Pd, a Ag—Pd alloy, and Au. The baked layer 30a may be one layer or may be multiple layers. The baked layer 30a is preferably formed by applying an electrically conductive paste containing glass and the metal to the multilayer body 2 and baking the applied paste. The baked layer 30a is fired simultaneously with the inner electrode layers 15 in an example embodiment but is not limited to this; it may be fired after the inner electrode layers 15 are fired.

In an example embodiment, the conductive resin layer 30b contains electrically conductive particles and a thermosetting resin. Specific examples of thermosetting resins that can be used include known various thermosetting resins, such as, for example, epoxy resins, phenolic resins, urethane resins, silicone resins, and polyimide resins. The metal component can be, for example, Ag or a metal powder obtained by coating the surface of a base metal powder with Ag. When the conductive resin layer 30b is formed, it may be formed directly on the multilayer body 2, without the formation of a baked layer 30a. The conductive resin layer 30b may be one layer or may be multiple layers.

The conductive resin layer 30b, which contains a thermosetting resin, is rich in flexibility than, for example, a plating film or the baked layer 30a, which is a product of firing of an electrically conductive paste. By virtue of this, even when the multilayer ceramic capacitor 1 is exposed to physical impact or impact resulting from thermal cycling, the conductive resin layer 30b functions as a buffer layer, preventing cracks from developing in the multilayer ceramic capacitor 1. Likely to absorb piezoelectric vibrations, furthermore, the conductive resin layer 30b has a suppression effect on "naki" (acoustic noise).

The thin-film layer 30c is preferably a 1-μm or thinner layer that is formed by a thin-film formation method, such as sputtering or deposition, and in which metal particles have been deposited.

The plating layer 31 preferably includes plating of, for example, one metal selected from Cu, Ni, Sn, Pb, Au, Ag, Pd, Bi, Zn, and a Ag—Pd alloy or an alloy containing that metal, for example. The plating layer 31 is preferably formed of multiple layers, and the plating layer 31 in an example embodiment includes a first plating layer 31*a* and a second plating layer 31*b* located on the first plating layer 31*a*. In an example embodiment, the first plating layer 31*a* is Ni plating, and the second plating layer 31*b* is Sn plating. The Ni plating layer 31 is capable of preventing solder used in the mounting of the ceramic electronic component from corroding the base electrode layer 30. The Sn plating layer 31 improves wettability in the mounting of the ceramic electronic component, allowing for easy mounting.

The outer electrodes 3, furthermore, may be devoid of a base electrode layer 30. and may be formed by placing a plating layer 31 on the multilayer body 2 directly. In that case, the inner electrode layers 15 and the plating layer 31 are coupled directly. In that case, furthermore, a catalyst may be placed on the multilayer body 2 as a pretreatment.

In that case, the plating layer 31 preferably includes a first plating layer 31*a* and a second plating layer 31*b* located on the first plating layer 31*a*. The first plating layer 31*a* and the second plating layer 31*b* preferably include plating of, for example, one metal selected from the group consisting of Cu, Ni, Sn, Pb, Au, Ag, Pd, Bi, and Zn or an alloy containing that metal.

In addition, when the inner electrode layers 15 are made using, for example, Ni, the first plating layer 31*a* is preferably made using Cu, which exhibits good bondability with Ni. The second plating layer 31*b*, furthermore, is preferably made using Sn or Au, which exhibits good wettability, and the first plating layer 31*a* is preferably made using Ni, which has a solder-barrier capability. The second plating layer 31*b* is optional, and the outer electrodes 3 may be ones formed by the first plating layer 31*a*. The second plating layer 31*b* may be provided as the outermost layer of the plating layer 31, or another plating layer may be placed on the second plating layer 31*b*. The plating layer 31 preferably contains no glass. The metal content per unit volume of the plating layer 31 is preferably about 99% by volume or more.

Figure 7:
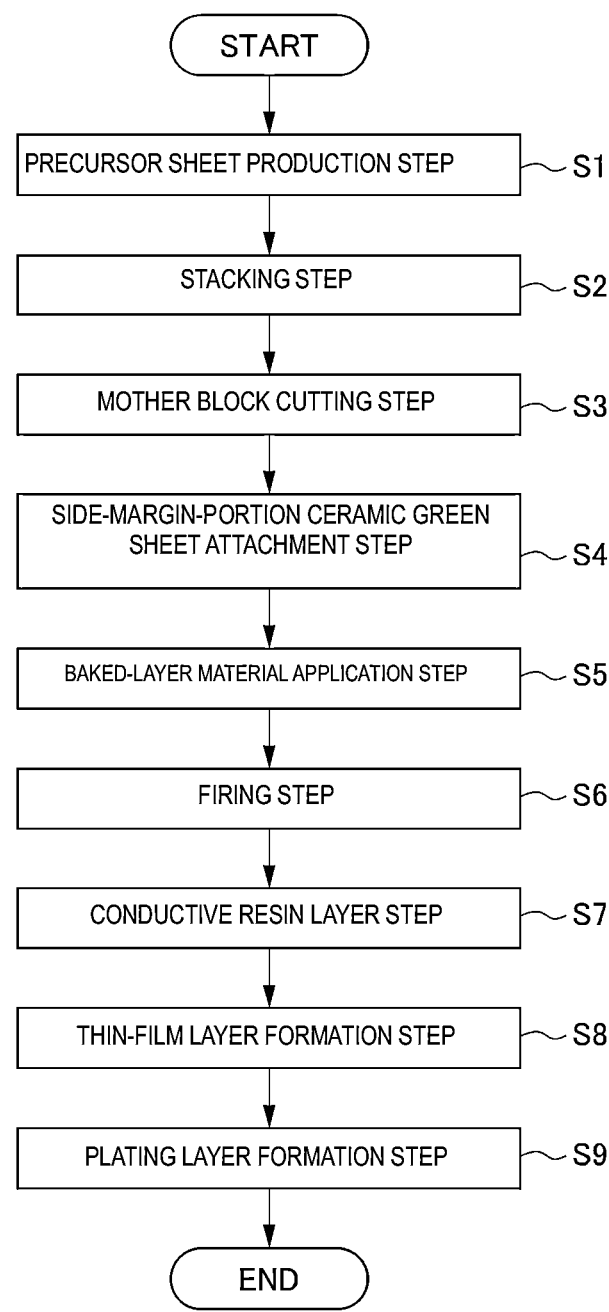
FIG. 7 is a flowchart with which a method for manufacturing multilayer ceramic capacitors 1 according to an example embodiment of the present invention is described.
Figure 8:
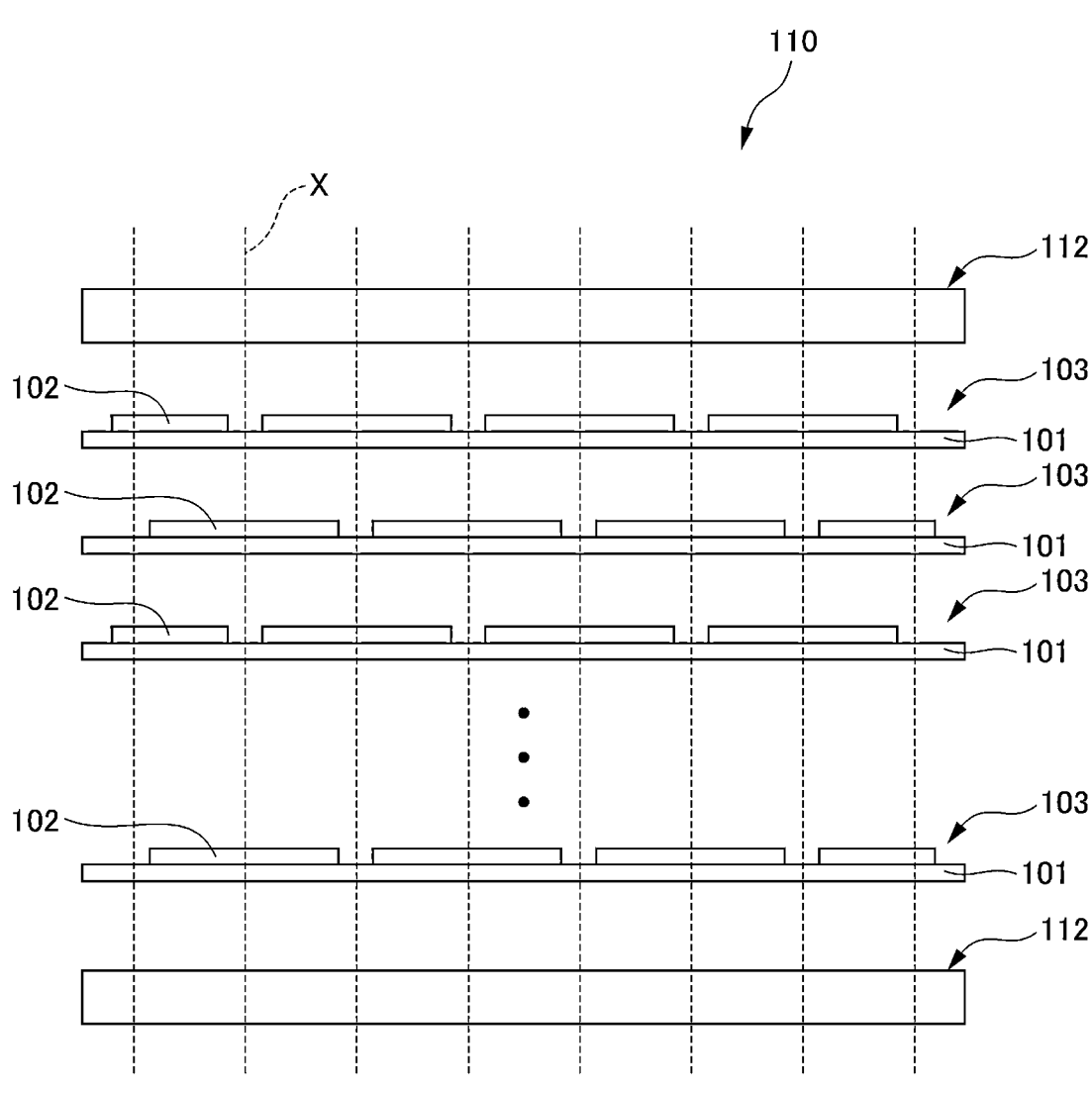
FIG. 8 is a diagram with which a method for manufacturing multilayer ceramic capacitors 1 according to an example embodiment of the present invention is described.

FIG. 7 is a flowchart with which an example embodiment of a method for manufacturing multilayer ceramic capacitors 1 is described. FIG. 8 is a diagram with which a method for manufacturing multilayer ceramic capacitors 1 is described.

First, a ceramic slurry for inner dielectric layers, which contains a ceramic powder containing Ba and Ti components, a binder, a solvent, and Si, is prepared. This ceramic slurry for inner dielectric layers is shaped into sheets on a carrier film using, for example, a die coater, gravure coater, or microgravure coater, and inner-dielectric-layer ceramic green sheets 101 are produced therethrough.

Subsequently, an electrically conductive paste containing Ni is applied to the inner-dielectric-layer ceramic green sheets 101 in a stripe pattern by, for example, screen printing, inkjet printing, or gravure printing, and a conductive pattern 102 is formed therethrough. As a result of this, precursor sheets 103 are produced that are formed by an inner-dielectric-layer ceramic green sheet 101, which is to be an inner dielectric layer 14, and a conductive pattern 102, which is to be an inner electrode layer 15, printed on its surface.

A ceramic slurry for outer layer portions, which contains a ceramic powder containing Ba, Ti, and Ni, a binder, and a solvent like the ceramic slurry for inner dielectric layers, is also prepared. This ceramic slurry for outer layer portions is shaped into sheets on a carrier film using, for example, a die coater, gravure coater, or microgravure coater, and outer-layer-portion ceramic green sheets 112 are produced therethrough.

Subsequently, multiple precursor sheets 103 are stacked. As illustrated in FIG. 8, multiple precursor sheets 103 are stacked in such a manner that the stripe conductive patterns 102 will face in the same direction and that these stripe conductive patterns 102 will be displaced from each other by half the pitch in the width direction W between adjacent precursor sheets 103. Then outer-layer-portion ceramic green sheets 112, which are to be the outer layer portions 22, are placed on two sides of the stacked multiple precursor sheets 103, with one outer layer portion on each side.

Then the outer-layer-portion ceramic green sheets 112 and the stacked multiple precursor sheets 103 are joined together by heat and pressure bonding. Through this, a mother block 110 is produced.

Subsequently, the mother block 110 is cut along the cutting-plane lines X illustrated in FIG. 8, which correspond to the dimensions of multilayer body chips 10, and cutting-plane lines crossing the cutting-plane lines X (not illustrated). Through this, multiple multilayer body chips 10 are manufactured.

A ceramic green sheet for side margin portions, which contains a ceramic powder containing Ba and Ti components, a binder, and a solvent, is prepared. The ceramic green sheet for side margin portions is applied to the surface of a carrier film and dried. Then, the ceramic green sheets for side margin portions are placed to face the side surfaces of the multilayer body chips 10 and punched by pressing the chips against them, and the ceramic green sheets for side margin portions are attached to the side surfaces of the multilayer body chips 10 therethrough.

To two end surfaces C of the multilayer body chips 10 to which ceramic green sheets for side margin portions have been attached, the material for a baked layer 30*a* as a component of a base electrode layer 30 is attached.

Then the multilayer body chips 10 to which the material for a baked layer 30*a* has been attached are subjected to a degreasing treatment under predetermined conditions in a nitrogen atmosphere, and then the chips are fired at a predetermined temperature in a nitrogen-hydrogen-steam mixed atmosphere. The chips are sintered, turning into multilayer bodies 2 on which a baked layer 30*a* and a conductive resin layer 30*b* have been formed.

In this firing step S6, Ni in each outer layer portion 22 that is present in the vicinity of its adjacent outermost inner electrode layer 150 is absorbed by the outermost inner electrode layer 150. As a result of this, a Ni-free region 22A is formed in the outer layer portions 22 within about 0.9 μm from their adjacent outermost inner electrode layers 150.

The outermost inner electrode layers 150 that have absorbed Ni present in the outer layer portions 22 within about 0.9 μm from their adjacent outermost inner electrode layers 150, furthermore, become thicker than the inside inner electrode layers 153. Along with this, uniformity in the thickness of the outermost inner electrode layers 150 increases through the absorption of Ni, and the CV decreases. The value of this CV can be controlled by adjusting, for example, the amount of Ni contained in the outer layer portions 22.

When fired, the outermost inner electrode layers 150 are prone to degradation compared with the inside inner electrode layers 153 because they are affected by the effects of heat. According to an example embodiment, however, the inside inner electrode layers 153 improve in strength and become less susceptible to thermal degradation because of the increase in thickness. The thickening of the outermost inner electrode layers 150, furthermore, helps limit the conduction of heat to the inside inner electrode layers 153.

Then a material for the conductive resin layer 30b, which contains electrically conductive particles and a thermosetting resin, is attached onto the baked layer 30a.

Then a thin-film layer 30c, which is a 1-μm or thinner layer in which metal particles have been deposited by a thin-film formation method, such as, for example, sputtering or deposition, is formed on the material for the conductive resin layer 30b on the multilayer bodies 2.

In an example embodiment, a first plating layer 31a that is a Ni plating layer is formed, and a second plating layer 31a that is Sn plating is formed on the first plating layer 31a, both as a plating layer 31. Through these steps, multilayer ceramic capacitors 1 are manufactured.

EXAMPLES

FIG. 9 is a table presenting the results of a measurement of the mean time to failure (MTTF) of multilayer ceramic capacitors 1 of Example 1 to Example 21, which are according to the present invention, and multilayer ceramic capacitors 1 of Comparative Example 1 to Comparative Example 4, which are different from the present invention. In the following, multilayer ceramic capacitors of comparative examples, too, will be described using the same reference signs as in an example embodiment.

The mean time to failure is the average time until a failure occurs when a voltage of 5.1 V is applied across the outer electrodes of the multilayer ceramic capacitor 1 in a 150° C. environment. A mean time to failure equal to or longer than 70 hours (hr) means that the capacitor is acceptable and is denoted with ○ or ◎ under the ASSESSMENT RESULT in the table in FIG. 9. A mean time to failure shorter than 70 means that the capacitor is unacceptable and is denoted with X.

For the multilayer ceramic capacitors 1 of examples and comparative examples, the thickness of the outermost inner electrode layers 150 is approximately 0.4 μm for all, and the thickness of the inside inner electrode layers 153 is approximately 0.3 μm for all. For the outer layer portions 22, furthermore, the portion within 0.9 μm from the adjacent outermost inner electrode layer 150 is a Ni-free region 22A, and the region extending away from the outermost inner electrode layer 150 by more than 0.9 μm is a Ni-containing region 22B.

In Example 1 to Example 21, which are according to an example embodiment, the CV for the thickness of the outermost inner electrode layers 150 is smaller than that for the inside inner electrode layers 153. That is, the outermost inner electrode layers 150 exhibit smaller variations in thickness than the inside inner electrode layers 153.

By contrast, in Comparative Example 1 to Comparative Example 4, the CV for the thickness of the outermost inner electrode layers 150 is greater than that for the inside inner electrode layers 153. That is, the outermost inner electrode layers 150 exhibit greater variations in thickness than the inside inner electrode layers 153.

As shown in the table, in Example 1 to Example 21, the mean time to failure (mean time to failure) is longer than 70 hours (hr) for all. By contrast, in Comparative Examples 1 to 4, the mean time to failure (mean time to failure) is shorter than 70 hours for all.

In particular, when Example 15 and Comparative Example 2 are compared, the Mg content in relation to Ti is equal in both at 1.000 mol %, and the Mn content in relation to Ti is equal in both at 0.6 mol %.

For Example 15, however, the Ni content in relation to Ti is 1.5 mol %, and the CV for the outermost inner electrode layers 150 is 0.19, smaller than 0.24 for the inside inner electrode layers 153. In this Example 15, the mean time to failure is 73 hours.

By contrast, for Comparative Example 2, the Ni content in relation to Ti is 0.2 mol %, and the CV for the outermost inner electrode layers 150 is 0.28, greater than 0.24 for the inside inner electrode layers 153. In this Comparative Example 2, the mean time to failure is 35 hours.

It can, therefore, be understood that Example 15, in which the conditions other than the Ni content in relation to Ti are the same compared to those in Comparative Example 2, achieved a longer mean time to failure as a result of an increased Ni content in relation to Ti and a reduced CV for the outermost inner electrode layers 150.

Overall, according to Example 1 to Example 21, which are according to an example embodiment and in which the outermost inner electrode layers 150 had a smaller CV for thickness than the inside inner electrode layers 153, the mean time to failure extended compared with cases in which the outermost inner electrode layers 150 had a greater CV for thickness than the inside inner electrode layers 153 as in Comparative Examples 1 to 4; the mean time to failure was longer than the acceptance limit of 70 hours.

For Example 2 to Example 9, Example 11 to Example 14, and Example 16 to Example 21, in which the CV for the thickness of the outermost inner electrode layers 150 is 0.09 or greater and 0.17 or less, furthermore, the mean time to failure is 78 hours or longer.

By contrast, for Examples 1, 10, and 15, in which the CV for the thickness of the outermost inner electrode layers 150 is 0.19 or greater, the mean time to failure is 75 hours or shorter.

From these, it can be understood that the CV for the thickness of the outermost inner electrode layers 150 is more preferably 0.09 or greater and 0.17 or less.

(Preferred Range for the Mg Content in Relation to Ti)

For Examples 4, 10, 11, 12, 13, 14, and 15, which are according to an example embodiment, furthermore, the Ni content in relation to Ti is equal in all at 1.5 mol %, and the Mn content in relation to Ti is equal in all at 0.6 mol %.

For Example 10, however, the Mg content in relation to Ti is at or below the analytical limit, and the mean time to failure is 74 hours. For Example 4, the Mg content in relation to Ti is 0.001 mol %, and the mean time to failure is 105 hours. For Example 11, the Mg content in relation to Ti is 0.005 mol %, and the mean time to failure is 100 hours. For Example 12, the Mg content in relation to Ti is 0.010 mol %, and the mean time to failure is 101 hours. For Example 13, the Mg content in relation to Ti is 0.050 mol %, and the mean time to failure is 81 hours. For Example 14, the Mg content in relation to Ti is 0.500 mol %, and the mean time to failure is 78 hours. For Example 15, the Mg content in relation to Ti is 0.100 mol %, and the mean time to failure is 72 hours.

That is, when the Mg content in relation to Ti is 0.001 mol % or more and 0.01 mol % or less, which is the range in Examples 4, 11, and 12, the mean time to failure is 100 hours or longer. By contrast, in Example 10, in which the Mg content in relation to Ti is smaller than 0.001 mol %, or in Examples 13, 14, and 15, in which the Mg content in relation to Ti is greater than 0.01 mol %, the mean time to failure is 81 hours or shorter.

From these, it can be understood that the Mg content in relation to Ti is preferably 0.001 mol % or more and 0.01 mol % or less.

For Examples 2, 3, 4, 5, 6, 7, and 9, which are according to an example embodiment, furthermore, the Mg content in relation to Ti is equal in all at 0.001 mol %, and the Ni content in relation to Ti is equal in all at 0.60 mol %.

For Example 2, however, the Ni content in relation to Ti is 0.04 mol %, and the mean time to failure is 95 hours. For Example 3, the Ni content in relation to Ti is 1.0 mol %, and the mean time to failure is 99 hours. For Example 4, the Ni content in relation to Ti is 1.5 mol %, and the mean time to failure is 105 hours. For Example 5, the Ni content in relation to Ti is 2.0 mol %, and the mean time to failure is 102 hours. For Example 6, the Ni content in relation to Ti is 3.5 mol %, and the mean time to failure is 99 hours. For Example 7, the Ni content in relation to Ti is 5.0 mol %, and the mean time to failure is 98 hours. For Example 9, the Ni content in relation to Ti is 10.0 mol %, and the mean time to failure is 78 hours.

That is, when the Ni content in relation to Ti is 0.4 mol % or more and 5.0 mol % or less, which is the range in Examples 2, 3, 4, 5, 6, and 7, the mean time to failure is 95 hours or longer. By contrast, in Example 9, in which the Ni content in relation to Ti is greater than 5.0 mol %, the mean time to failure is 78 hours.

From these, it can be understood that the Ni content in relation to Ti is preferably 0.4 mol % or more and 5.0 mol % or less.

(Preferred Range for the Mn Content in Relation to Ti)

For Examples 16, 17, 18, 19, 20, and 21, furthermore, the Ni content in relation to Ti is equal in all at 1.5 mol %, and the Mg content in relation to Ti is equal in all at 0.001 mol %.

For Example 21, however, the Mn content in relation to Ti is 0.03 mol %, and the mean time to failure is 78 hours. For Example 20, the Mn content in relation to Ti is 0.05 mol %, and the mean time to failure is 95 hours. For Example 19, the Mn content in relation to Ti is 0.20 mol %, and the mean time to failure is 97 hours. For Example 18, the Mn content in relation to Ti is 0.40 mol %, and the mean time to failure is 108 hours. For Example 17, the Mn content in relation to Ti is 0.80 mol %, and the mean time to failure is 113 hours. For Example 16, the Mn content in relation to Ti is 1.00 mol %, and the mean time to failure is 80 hours.

That is, when the Mn content in relation to Ti is 0.05 mol % or more and 0.80 mol % or less, which is the range in Examples 19, 18, and 17, the mean time to failure is 95 hours or longer. By contrast, in Example 21, in which the Mn content in relation to Ti is 0.03 mol %, or in Example 16, in which the Mn content in relation to Ti is 1.0 is 0.01 mol %, the mean time to failure is 80 hours or shorter.

From these, it can be understood that the Mn content in relation to Ti is preferably about 0.05 mol % or more and about 0.80 mol % or less.

Advantages

Overall, according to a multilayer ceramic capacitor 1 according to an example embodiment, at least one of its outer layer portions 22 includes a Ni-free region 22A extending within about 0.9 μm from the outermost inner electrode layer 150 closest to the outer layer portion 22 and a Ni-containing region 22B extending away from the outermost inner electrode layer 150 by more than about 0.9 μm, and at least one of its outermost inner electrode layers 150 is thicker than inside inner electrode layers 153, with smaller variations in thickness. These help make the mean time to failure longer.

For the multilayer ceramic capacitor 1 according to an example embodiment, the mean time to failure can be further extended by setting the mol % of Ni to Ti to about 0.4 mol % or more and about 5.0 mol % or less.

For the multilayer ceramic capacitor 1 according to an example embodiment, furthermore, the mean time to failure can be further extended by setting the mol % of Mg to Ti to about 0.001 mol % or more and about 0.01 mol % or less.

Moreover, for the multilayer ceramic capacitor 1 according to an example embodiment, the mean time to failure can be further extended by setting the mol % of Mn to Ti to about 0.05 mol % or more and about 0.0.8 mol % or less.

An example embodiment of the present invention has been described hereinabove. The present invention, however, is not limited to this example embodiment and is modified in various ways within the scope of the gist thereof.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including an inner layer portion in which a plurality of inner electrode layers and a plurality of inner dielectric layers are stacked alternately and two outer layer portions located at surfaces on two sides of the inner layer portion in a stacking direction, with one outer layer portion on each side; and
two outer electrodes located at end surfaces of the multilayer body, the end surfaces being surfaces on two sides in a length direction, which crosses the stacking direction, with one outer electrode at each end surface; wherein
the inner electrode layers include outermost inner electrode layers, which are the closest to each of the outer layer portions, and an inside inner electrode layer, which is an inner electrode layer other than the outermost inner electrode layers;
at least one of the outer layer portions includes a Ni-free region extending within about 0.9 μm from the outermost inner electrode layer closest to the outer layer portion and a Ni-containing region extending away from the outermost inner electrode layer by more than about 0.9 μm; and
at least one of the outermost inner electrode layers is thicker than the inside inner electrode layer, with smaller variations in thickness.

2. The multilayer ceramic capacitor according to claim 1, wherein:
the outer layer portions contain Ti and Ni, and a molar ratio of Ni to Ti is about 0.4 mol % or more and about 5.0 mol % or less.

3. The multilayer ceramic capacitor according to claim 1, wherein:
the outer layer portions contain grains, and, for each of the grains:
a difference, from a molar ratio of the Ni to Ti in an outer region of the grain, which extends within 10 nm from an outside of the grain, of a molar ratio of the Ni to Ti in a central region of the grain, which is a region other than the outer region, is within about ±20%.

4. The multilayer ceramic capacitor according to claim 1, wherein:
a standard deviation/average for a thickness of the outermost inner electrode layers is about 0.09 or greater and about 0.17 or less.

5. The multilayer ceramic capacitor according to claim 1, wherein:

the outer layer portions contain Ti and Mg, and a molar ratio of Mg to Ti is about 0.001 moles or more and about 0.01 moles or less.

6. The multilayer ceramic capacitor according to claim 1, wherein:

the outer layer portions contain Ti and Mn, and a molar ratio of Mn to Ti is about 0.05 mol % or more and about 0.08 mol % or less.

7. The multilayer ceramic capacitor according to claim 1, wherein:

the inner dielectric layers are about 0.4 μm or more and about 0.5 μm or less.

8. The multilayer ceramic capacitor according to claim 1, wherein:

the inner dielectric layers are about 0.4 μm or more and about 0.45 μm or less.

9. The multilayer ceramic capacitor according to claim 1, wherein:

a thickness of the inside inner electrode layer is about 0.3 μm or more and about 0.4 μm or less.

10. The multilayer ceramic capacitor according to claim 1, wherein:

a thickness of the inside inner electrode layer is about 0.3 μm or more and about 0.35 μm or less.

11. The multilayer ceramic capacitor according to claim 1, wherein:

the inner electrode layers include multiple first inner electrode layers and multiple second inner electrode layers which are arranged alternately.

12. The multilayer ceramic capacitor according to claim 11, wherein:

the first inner electrode layers include first opposing portions which oppose the second inner electrode layers, and first extended portions which extend from the first opposing portions toward one of the end surfaces;

end portions of the first extended portions are exposed on the one of the end surfaces and electrically coupled to a first of the two outer electrodes;

the second inner electrode layers include second opposing portions which oppose the first inner electrode layers, and a second extended portions which extended from the second opposing portion toward another one of the end surfaces; and end portions of the second extended portions are exposed on the other one of the end surfaces and electrically coupled to a second of the two outer electrodes.

13. The multilayer ceramic capacitor according to claim 1, wherein a total number of the inner electrode layers is about 10 or more and about 1000 or fewer.

14. The multilayer ceramic capacitor according to claim 1, wherein a total number of the inner dielectric layers is about 100 or more and about 2000 or fewer.

15. The multilayer ceramic capacitor according to claim 1, wherein the two outer electrodes each include a base electrode layer and a plating layer located on the base electrode layer; and the base electrode layer includes at least one of a baked layer, a conductive resin layer, and a thin-film layer.

* * * * *